US012077653B2

United States Patent
Poole et al.

(10) Patent No.: US 12,077,653 B2
(45) Date of Patent: Sep. 3, 2024

(54) BUILD MATERIALS FOR PHOTOCHEMICAL ADDITIVE MANUFACTURING APPLICATIONS

(71) Applicant: University of South Alabama, Mobile, AL (US)

(72) Inventors: Gregory M. Poole, Brookwood, AL (US); W. Matthew Reichert, Mobile, AL (US)

(73) Assignee: University of South Alabama, Mobile, AL (US)

( * ) Notice: Subject to any disclaimer, the term of this patent is extended or adjusted under 35 U.S.C. 154(b) by 870 days.

(21) Appl. No.: 16/817,320

(22) Filed: Mar. 12, 2020

(65) Prior Publication Data

US 2020/0291204 A1  Sep. 17, 2020

Related U.S. Application Data

(60) Provisional application No. 62/818,820, filed on Mar. 15, 2019.

(51) Int. Cl.
| | |
|---|---|
| *C08K 5/34* | (2006.01) |
| *B29C 64/129* | (2017.01) |
| *B33Y 10/00* | (2015.01) |
| *B33Y 70/00* | (2020.01) |
| *C08F 120/14* | (2006.01) |
| *C08K 5/3445* | (2006.01) |
| *C09D 4/00* | (2006.01) |
| *B29K 105/00* | (2006.01) |

(52) U.S. Cl.
CPC .......... *C08K 5/3445* (2013.01); *B29C 64/129* (2017.08); *B33Y 10/00* (2014.12); *B33Y 70/00* (2014.12); *C08F 120/14* (2013.01); *C09D 4/00* (2013.01); *B29K 2105/0002* (2013.01)

(58) Field of Classification Search
None
See application file for complete search history.

(56) References Cited

U.S. PATENT DOCUMENTS

| | | | |
|---|---|---|---|
| 4,844,144 | A | 7/1989 | Murphy et al. |
| 6,017,973 | A | 1/2000 | Teijin |
| | | (Continued) | |

FOREIGN PATENT DOCUMENTS

| | | | | |
|---|---|---|---|---|
| WO | WO-2016121587 A1 * | 8/2016 | ............ | B29C 64/00 |
| WO | 2018/022785 | 2/2018 | | |

(Continued)

OTHER PUBLICATIONS

Jing Zhang and Pu Xiao, 3D Printing of Photopolymers, Polym. Chem., 2018, 9, 1530-1540 (Feb. 22, 2018).

(Continued)

*Primary Examiner* — Sanza L. McClendon
(74) *Attorney, Agent, or Firm* — Foryt Patent Services LLC

(57) ABSTRACT

A photopolymerizable build material for photochemical additive manufacturing applications is disclosed. The photopolymerizable build material includes (i) a photopolymerizable monomer; (ii) a photoinitiator; and (iii) an ionic modifying agent. An additive manufactured article that includes at least 50 photopolymerized layers formed from the photopolymerizable build material and an additive manufacturing method for producing a three-dimensional article are also described.

15 Claims, 2 Drawing Sheets

(56) References Cited

U.S. PATENT DOCUMENTS

| | | | |
|---|---|---|---|
| 7,964,248 | B2 | 6/2011 | Fong et al. |
| 9,738,748 | B2 * | 8/2017 | Takenouchi ............ C08G 18/69 |
| 9,796,740 | B2 | 10/2017 | Cunningham et al. |
| 9,822,204 | B2 | 11/2017 | Crivello |
| 9,969,823 | B1 | 5/2018 | Luebke et al. |
| 10,711,149 | B2 * | 7/2020 | Kiyosada ............. C09D 11/106 |
| 2004/0204513 | A1 | 10/2004 | Hirdo et al. |
| 2009/0220917 | A1 | 9/2009 | Jensen et al. |
| 2016/0229123 | A1 | 8/2016 | Carlson et al. |
| 2016/0332367 | A1 | 11/2016 | Dentsply |
| 2016/0369040 | A1 | 12/2016 | Novoset |
| 2018/0243984 | A1 | 8/2018 | Hayashida et al. |
| 2018/0291219 | A1 | 10/2018 | Kiyosada |
| 2019/0001553 | A1 | 1/2019 | Robeson et al. |
| 2019/0022941 | A1 | 1/2019 | Ackuretta |
| 2019/0055171 | A1 * | 2/2019 | Straathof ................ C06B 45/10 |

FOREIGN PATENT DOCUMENTS

| | | |
|---|---|---|
| WO | 2018/022810 | 2/2018 |
| WO | 2018/057330 | 3/2018 |
| WO | 2018/156766 A2 | 8/2018 |

OTHER PUBLICATIONS

Mark P. Scott, Christopher S. Brazel, Michael G. Benton, Jimmy W. Mays, John D. Holbrey and Robin D. Rogers, Application of Ionic Liquids as Plasticizers for Poly(methyl methacrylate); Chem. Comm., 13, 1370 (2002).

Mark P. Scott, Mustafizur RAHMAN and Christopher S. Brazel, Application of Ionic Liquids as Low-Volatility Plasticizers for PMMA; Eur. Poly. J., 39, 1947 (2003).

Mustafizur Rahman and Christopher S. Brazel, Ionic Liquids: New Generation Stable Plasticizers for Poly(vinyl chloride); Polym. Degrad. Stab. 91, 3371 (2006).

Dong-Hyeon Ko, Ki-Won Gyak and Dong-Pyo Kim; Emerging Microreaction Systems Based on 3D Printing Techniques and Separation Technologies, J. Flow Chem. 2017, 7(3-4), 72-81.

C. S. Brazel and S. L. Rosen, Fundamental Principles of Polymeric Materials, 3rd ed., Chapter 18, Wiley Interscience, New York (2012).

Ko et al., Emerging Microreaction Systems Based on 3D Printing, . . . .

* cited by examiner

BUILD MATERIALS FOR PHOTOCHEMICAL ADDITIVE MANUFACTURING APPLICATIONS

FIELD OF THE INVENTION

The present invention generally pertains to build materials useful in conjunction with additive manufacturing processes, in particular additive manufacturing processes which include photochemical polymerization.

BACKGROUND OF THE INVENTION 3D printing, also known in the art as additive manufacturing, refers to a class of processes for the production of three-dimensional articles wherein multiple layers of a material [referred to sometimes in the art as a "build material"] are, typically with the aid of computer-aided design (CAD), sequentially formed on a layer-by-layer basis with one layer on top of another, to "build" a useful article. Such processes have been previously utilized in the manufacture of test prototypes, models and molds; however, more recently these processes have been increasingly employed for commercially useful manufacturing devices, production parts, consumer products, medical devices and the like.

A number of individual technologies have emerged as useful under the general umbrella of additive manufacturing. Among these technologies, a "photochemical" approach has been identified as having many environmental, economic and production process advantages and as being particularly attractive for the manufacture of objects with intricate and complex structures or features. In photochemical additive manufacturing methods, a build material that typically includes (i) one or more photopolymerizable monomers and/or oligomers and (ii) one or more photoinitiators is selectively irradiated (such as with electromagnetic energy in the ultraviolet wavelength range) under CAD control to selectively photopolymerize (or photocrosslink or photocure) the photopolymerizable material. Photochemical 3D printing methods are well known in the art and include for example, two-photon polymerization, stereolithography (SLA), digital light processing (DLP) and continuous liquid interface production (CLIP). Such methods are generally described for example in U.S. Published Patent Application Nos. 20190022941A1; 20160229123A1 and 20160332367A1, the contents and disclosure of which are each hereby incorporated herein by reference.

With commercial use of and new applications for 3D printing generally and photochemical 3D printing in particular both growing exponentially at a rapid pace, need for and development of new 3D printing build materials and their components has followed. For example, chemically complex custom photopolymerizable monomers and oligomers such as described in U.S. Published Patent Application No. 20180215933A1 and U.S. Pat. No. 9,822,204B2 have been developed but can be unproven commercially, less robust in commercial manufacturing methods and expensive to manufacture at high volumes with the consistency and uniformity required for 3D printing. Analogously, newly developed but chemically complex photoinitiators and photoinitiator systems such as described in U.S. Pat. Nos. 7,964,248B2 and 9,796,740B2 can carry with them similar drawbacks. Photopolymer build materials utilizing commercial monomers/oligomers and photoinitiators that have been used historically for other applications outside 3D printing are often unproven in the 3D printing space and can struggle to meet the processing conditions of 3D printing methods and stringent requirements of many 3D printed articles, particularly those in the biomaterial and medical device fields. For example, as described in Jing Zhang and Pu Xiao, 3D Printing of Photopolymers, *Polym. Chem.*, 2018, 9, 1530-1540 (22 Feb. 2018), multifunctional (meth) acrylate monomers and oligomers have been used in photochemical 3D build materials and can demonstrate useful qualities; however, Zhang and Xaio note that the 3D printed objects from these multifunctional resins "are normally brittle due to the highly crosslinked and inhomogeneous polymer networks which limits their versatility of applications".

An ongoing need therefore exists for photopolymerizable build materials that are low cost, processable under a wide variety of additive manufacturing conditions and easily tunable to produce custom photochemical additive manufactured articles with specific physical and performance properties that meet tightly defined end-use application specifications.

SUMMARY OF THE INVENTION

In a first aspect, the present invention relates to a photopolymerizable build material for additive manufacturing applications. The build material includes (i) a photopolymerizable monomer; (ii) a photoinitiator; and (iii) an ionic modifying agent.

In a second aspect, the present invention relates to an additive manufactured article that includes at least 50 photopolymerized layers formed from a photopolymerizable build material that includes (i) a photopolymerizable monomer; (ii) a photoinitiator; and (iii) an ionic modifying agent.

In a third aspect, the present invention relates to an additive manufacturing method for producing a three-dimensional article. The method of the present invention includes the steps of:
(a) forming a layer of a build material onto a target surface, said build material including (i) a photopolymerizable monomer; (ii) a photoinitiator; and (iii) an ionic modifying agent;
(b) polymerizing the photopolymerizable monomer of the build material at the selected locations by directing electromagnetic wave energy to the selected locations of the layer, said locations corresponding to a cross-section of the three-dimensional article; and
(c) repeating the forming and polymerizing steps to form the three-dimensional article in layerwise fashion.

Further aspects of the invention are as disclosed and claimed herein.

BRIEF DESCRIPTION OF THE DRAWINGS

The invention will be described in further detail below, and with reference to the accompanying drawings, wherein FIG. 2 is a graphical plot of the data generated in the Examples set forth herein depicting the rate of change for reducing tensile modulus in the additive manufactured article of the present invention achieved via addition of ionic modifying agent in the photopolymerizable build material of the present invention when the article is manufactured using the method of the present invention with an optional curing step.

DETAILED DESCRIPTION

Figure 1:
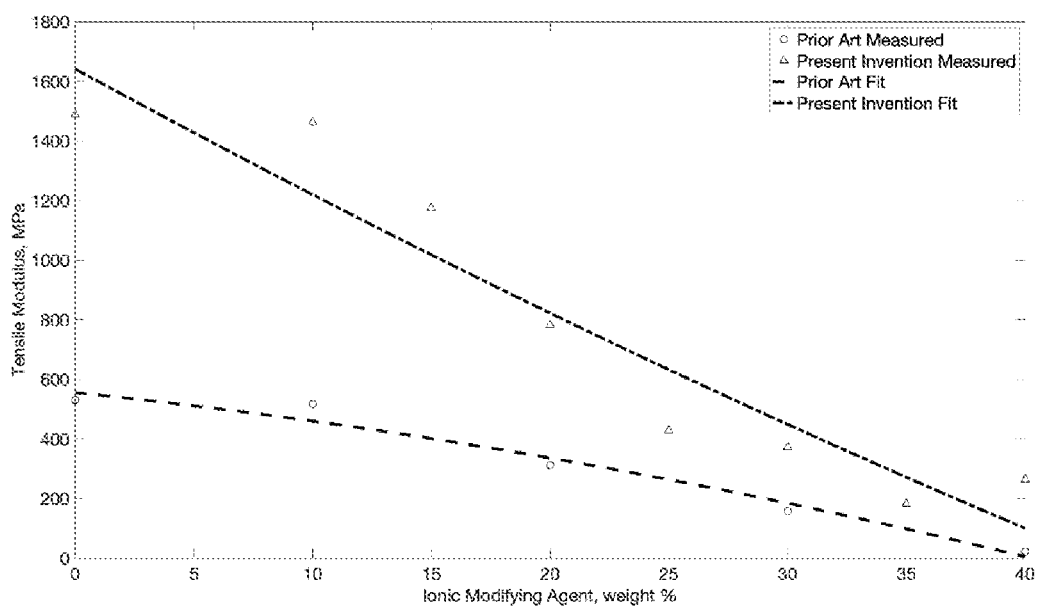
FIG. 1 is a graphical plot of the data generated in the Examples set forth herein depicting the rate of change for reducing tensile modulus in the additive manufactured article of the present invention achieved via addition of ionic modifying agent in the photopolymerizable build material of the present invention when the article is manufactured using the method of the present invention without an optional curing step.

In the first aspect of the present invention, the photopolymerizable build material of the present invention includes (i) a photopolymerizable monomer; (ii) a photoinitiator; and (iii) an ionic modifying agent.

The photopolymerizable monomer of the photopolymerizable build material of the present invention is any monomer which polymerizes in the presence of a suitable photoinitiator. Examples of suitable photopolymerizable monomer types include acrylate monomers (e.g., alkyl acrylates such as methacrylate monomers, esters of acrylic acid, salts of acrylic acid, conjugate bases of acrylic acids, and/or derivatives thereof), acrylic acid monomers, epoxy monomers, thiol monomers, vinyl monomers (e.g., styrenic monomers), vinyl amide monomers, vinyl ester monomers, silyl hydride monomers, and vinyl ether monomers. Specific examples of photopolymerizable monomers include without limitation 2-hydroxyethyl acrylate, N-isopropylacrylamide, (+/−)-epichlorohydrin, (+/−)-propylene oxide, butyl acrylate, tert-butyl acrylate, 2-(2-ethoxyethoxy) ethyl acrylate, isobornyl acrylate, cyclohexene oxide, dimethylacrylamide, methyl methacrylate, methyl acrylate, 2-hydroxy ethyl methacrylate, ethyl acrylate, and 4-vinyl-I-cyclohexene 1,2-epoxide, with methyl methacrylate and derivatives thereof being preferred in one or more embodiments. Two or more photopolymerizable monomers may be employed in combination to achieve desired results in an additive manufactured article or to achieve other advantages. In one or more embodiments, in particular in applications such as stereolithographic 3D printing which typically employ electromagnetic energy in or near the ultraviolet range to induce polymerization, the photopolymerizable monomer is photopolymerizable upon exposure to electromagnetic energy with a wavelength of between 200 nm and 450 nm, or between 350 nm and 400 nm, or between 390 nm and 410 nm.

As used herein, the term "monomers" is intended to include without limitation single chemical repeat units as well as short-chain oligomers that include no more than 50 of said repeat units.

The type and amount of photopolymerizable monomer in the photopolymerizable composition of the present invention may vary based on factors such as for example, the selection and concentration of the other components of the build material composition, the desired characteristics of the final additive manufactured article, the specific 3D printing system, method and equipment employed and the 3D printing parameters such as wavelength, exposure time and intensity of electromagnetic energy employed to photopolymerize. Photopolymerizable monomer amounts may be from 40 to 99 percent by weight based on the total weight of the photopolymerizable build material. A preferred amount for the photopolymerizable monomer is from 45 to 95 percent by weight based on the total weight of the photopolymerizable build material with an amount of from 50 to 90 percent by weight based on the total weight of the photopolymerizable build material particularly preferred.

The photopolymerizable build material of the present invention further includes a photoinitiator. A suitable photoinitiator for the composition is any compound capable of initiating polymerization of the photopolymerizable monomer upon exposure to electromagnetic radiation, typically by inducing the localized formation of free radicals. Examples of suitable photoinitiators include cationic photoinitiators and radical photoinitiators.

Non-limiting cationic photoinitiators include onium salts with anions of weak nucleophilicity, e.g., halonium salts, iodosyl salts, sulfonium salts, sulfozonium salts, or diazonium salts. Metallocene salts are also suitable as cationic photoinitiators.

Commercially available cationic photoinitiators include without limitation Cyracure® UVI-6974 and UVI-6976 (which are a mixture of S,S,S,S'-Tetraphenylthiobis(4,1-phenylene)disulfonium dihexafluoroantimonate and diphenyl(4-phenylthiophenyl)sulfonium hexafluoroantimonate), Cyracure® UVI-6970, UVI-6960, UVI-6990, UVI-6992 (DOW Corp.), CD1010, CD-1011, CD-1012 (Sartomer Corp.), Adeka Optomer SP150, SP-151, SP-170, SP-171 (Asahi Denka Kogyo Co., Ltd.), Irgacure® 261, CI-2481, CI-2624, CI-2639, C12064 (Nippon Soda Co, Ltd.), and DTS-102, DTS-103, NAT-103, NDS-103, TPS-103, MDS-103, MPI-103, BBI-103 (Midori Chemical Co, Ltd.). Also preferred are salts of iodonium ions, such as Rhodorsil® 2074 (supplied by RHODIA company). Most preferred are UVI-6974, CD-1010, UVI-6976, UVI-6992, Adeka Optomer SP-170, SP-171, CD-1012, and MPI-103 and KI78 (hexafluoroantimony sulfonium salt from Adeka). The cationic photoinitiators can be used either individually or in combination of two or more. The cationic photoinitiator can comprise a PF6 salt.

The free radical photoinitiators may be chosen from those commonly used to initiate radical photopolymerization. Examples of free radical photoinitiators include without limitation benzoins, e.g., benzoin, benzoin ethers such as benzoin methyl ether, benzoin ethyl ether, benzoin isopropyl ether, benzoin phenyl ether, and benzoin acetate; acetophenones, e.g., acetophenone, 2,2-dimethoxyacetophenone, acetophenone, and 1,1-dichloroacetophenone; benzil ketals, e.g., benzil dimethylketal and benzil diethyl ketal; anthraquinones, e.g., 2-methylanthraquinone, 2-ethylanthraquinone, 2-tert-butylanthraquinone, 1-chloroanthraquinone and 2-amylanthraquinone; triphenylphosphine; benzoylphosphine oxides, e.g., 2,4,6-trimethylbenzoy-diphenylphosphine oxide (Luzirin TPO); bisacyiphosphine oxides; benzophenones, e.g., benzophenone and 4,4'-bis(N,N'-dimethylamino)benzophenone; thioxanthones and xanthones; acridine derivatives; phenazine derivatives; quinoxaline derivatives; 1-phenyl-1,2-propanedione 2-O-benzoyl oxime; 4-(2-hydroxyethoxy)phenyl-(2-propyl)ketone (Irgacure® 2959); 1-aminophenyl ketones or 1-hydroxy phenyl ketones, e.g., 1-hydroxycyclohexyl phenyl ketone, 2-hydroxyisopropyl phenyl ketone, phenyl 1-hydroxyisopropyl ketone, and 4-isopropylphenyl 1-hydroxyisopropyl ketone.

Two or more photoinitiators may be employed in combination to achieve desired results during photopolymerization, in the final additive manufactured article or other advantages. In one or more embodiments, in particular in applications such as stereolithographic 3D printing which typically employ electromagnetic energy in the ultraviolet range to induce polymerization, the photoinitiator induces polymerization of the photopolymerizable monomer upon exposure to electromagnetic energy with a wavelength of between 200 nm and 450 nm, or between 350 nm and 400 nm, or between 390 nm and 410 nm. Accordingly, in one or more embodiments the photoinitiator is characterized by a primary absorption wavelength of between 200 nm and 450 nm, or between 350 nm and 400 nm, or between 390 nm and 410 nm.

The type and amount of photoinitiator in the photopolymerizable composition of the present invention may vary based on factors such as for example, the selection and concentration of the photopolymerizable monomer and other components of the build material composition, the desired characteristics of the final additive manufactured article, the specific 3D printing system, method and equipment employed and the 3D printing method parameters such as wavelength, exposure time and intensity of electromagnetic energy employed to photopolymerize the photopolymerizable monomer. The amount of photoinitiator in the photopolymerizable build material of the present invention may be from 0.01 to 4 percent by weight based on the total weight of the photopolymerizable build material. A preferred amount for the photopolymerizable monomer is from 0.1 to 2 percent by weight based on the total weight of the photopolymerizable build material with an amount of from 0.5 to 1.2 percent by weight based on the total weight of the photopolymerizable build material particularly preferred.

It will be appreciated that blends or mixtures that include at least one photopolymerizable monomer and at least one photoinitiator are known in the art and available commercially, for example as Clear Resin™ and Greyscale Resin™ products from Formlabs. Accordingly, in one or more embodiments, the photopolymerizable monomer and photoinitiator of the build material of the present invention may be in the form of a flowable pre-formed blend. Such preformed blends are typically in liquid form and include a photopolymerizable monomer in liquid form with photoinitiator dissolved or suspended therein. Blends are described for example in U.S. Published Patent Application 20180312705A1, the contents and disclosure of which is hereby incorporated herein by reference.

The photopolymerizable build material of the present invention further includes an ionic modifying agent. The phrase "ionic modifying agent", as utilized herein, is defined to mean an ionic compound, for example a salt, that includes at least one cation and at least one anion and which has a melt point when measured according to ASTM E 324 of no more than 100° C. Ionic modifying agents include without limitation compounds known in the art as ionic liquids or ILs.

Suitable cations for the ionic modifying agent may be selected from the group consisting of ammonium, phosphonium, and sulfonium; N-containing heterocycles such as pyrazolium, imidazolium, triazolium, tetrazolium, pyridinum, pyrrolidinium, thiazolium, pyrimidinium, pyridazinium, pyrazinium, quinolinium, quinolinium and isoquinolinium; and substituted derivatives thereof. Suitable anions for the ionic modifying agent may be selected from the group consisting of bistriflimide, halogens, pseudohalogens, imidazolate, triazolate, tetrazolate, pyrazolate and substituted derivatives thereof. Preferred ionic modifying agents include at least one cation selected from the group consisting of ammonium, phosphonium, and sulfonium; N-containing heterocycles such as pyrazolium, imidazolium, triazolium, tetrazolium, pyridinum, pyrrolidinium, thiazolium, pyrimidinium, pyridazinium, pyrazinium, quinolinium, quinolinium, and isoquinolinium; and substituted derivatives thereof and at least one anion selected from the group consisting of bistriflimide, halogens, pseudohalogens, imidazolate, triazolate, tetrazolate, pyrazolate and substituted derivatives thereof.

Specific examples of ionic modifying agents include without limitation 1-butyl-3-methylimidazolium chloride, 1-butyl-3-methylimidazolium bromide, 1-butyl-3-methylimidazolium bistriflimide, 1-butyl-3-methylimidazolium triflate, 1-butyl-3-methylimidazolium triflate, and 1-butyl-3-methylimidazolium 3, 5-diamino-1,2,4-triazolate.

In one or more embodiments, the ionic modifying agent may also contain functional groups (such as alkenes, alkynes, acrylates, urethanes, epoxies, and the like) to create monomers which allow for copolymerization of the ionic modifying agent with the photopolymerizable monomer. Non-limiting examples of these embodiments include ionic modifying agents wherein the cation is selected from the group consisting of 1-allyl-3-methylimidzaolium, 1-pentenyl-3-methylimidazolium, and 1-octenyl-3-methylimidazolium, and more preferably wherein the anion is selected from the group consisting of bistriflimide, halogens, pseudohalogens, imidazolate, triazolate, tetrazolate, pyrazolate and substituted derivatives thereof. The ionic modifying agent in these embodiments may be referred to as an ionic modifying monomer that is copolymerizable with the photopolymerizable monomer.

As described in more detail below, the ionic modifying agent may impart certain attributes to an additive manufactured article from a photopolymerizable build material that includes it. For example, the ionic modifying agent may be a tensile modulus reduction agent; a flame retarding agent; or an energetic agent.

The type and amount of ionic modifying agent in the photopolymerizable build material of the present invention may vary based on factors such as for example, the selection and concentration of the photopolymerizable monomer and other components of the build material composition, the desired characteristics of the final additive manufactured article, the specific 3D printing system, method and equipment employed and the 3D printing method parameters such as wavelength, exposure time and intensity of electromagnetic energy employed to photopolymerize. Generally, the amount of ionic modifying agent in the photopolymerizable build material of the present invention may be from 0.5 to 60 percent by weight based on the total weight of the photopolymerizable build material. A preferred amount for the ionic modifying agent is from 5 to 50 percent by weight based on the total weight of the photopolymerizable build material with an amount of from 10 to 40 percent by weight based on the total weight of the photopolymerizable build material particularly preferred.

The photopolymerizable build material of the present invention may further include one or more optional components or ingredients. Such optional components include without limitation reactive diluents, polymerization inhibitors, release agents, wetting agents, levelling agents, sensitizers, antisettling agents, surface-active agents, colorants, heat stabilizers, light or radiation stabilizers, crosslinking agents, photosensitizers, blockers, plasticizers, antioxidants, compatibilizers, flow aids, filler materials and the like.

The photopolymerizable build materials of the present invention may be formed by mixing the components of the build material using conventional mixing techniques and devices well known in the art. As discussed previously, the photopolymerizable monomer may be in the form of the pre-formed blend. Accordingly, the build material may also be prepared by mixing an ionic modifying agent with a pre-formed blend that includes photopolymerizable monomer and photoinitiator, such blends being well known in the art and commercially available. One of ordinary skill will further appreciate that, in forming the build material of the present invention, the ionic modifying agent, if in a solid form, may be placed in solution with a suitable solvent prior to forming the composition to facilitate uniformity of blending. In such an approach, the solvent may need to be volatilized, e.g. by heating, prior to photopolymerization in forming a 3D printed article.

In one or more embodiments, a feature of the present invention is that highly customized additive manufactured articles with finely tuned physical properties, for example physical properties such as tensile modulus, may be easily, efficiently and rapidly achieved and maintained over time with the described build material. Accordingly, in another aspect, the present invention is directed to an additive manufactured article comprising at least 50 photopolymerized layers formed from the photopolymerizable build material described herein. In this aspect, the present invention is an additive manufactured article comprising at least 50 photopolymerized layers formed from a photopolymerizable build material that includes (i) a photopolymerizable monomer; (ii) a photoinitiator; and (iii) an ionic modifying agent. Suitable photopolymerized layers include poly (methyl methacrylate) or derivates thereof. In one or more embodiments in which the ionic modifying agent of the photopolymerizable build material is an ionic modifying monomer that is copolymerizable with the photopolymerizable monomer of the photopolymerizable build material, the photopolymerized layers include a copolymer formed from the photopolymerizable monomer and the ionic modifying monomer.

In one or more embodiments, the ionic modifying agent in the build material may be a tensile modulus reduction agent for the additive manufactured article. It has been surprisingly discovered that the amount of ionic modifying agent required to achieve a given tensile modulus reduction in the additive manufactured article is markedly lower that what would be expected from the prior art and further that the rate of change for reducing tensile modulus in the additive manufactured article via addition of ionic modifying agent in the build material is unexpectedly greater than what would be expected from the prior art. Accordingly, in one or more embodiments, the additive manufactured article of the present invention exhibits a tensile reduction rate of change or "TRR" of at least 30 or at least 50 or at least 100 or at least 125 when tensile modulus is tested according to ASTM D 638-02. TRR is generally defined as the absolute value of the ratio of change in additive manufactured article tensile modulus, typically in MPa, to change in concentration, in weight percent, of ionic modifying agent in the photopolymerizable build material used to form the article. Accordingly, TRR is calculated as follows:

$$TRR = |\Delta M / \Delta C|$$

wherein $\Delta M$ is the change in additive manufactured article tensile modulus measured in MPa and $\Delta C$ is the change in in concentration of ionic modifying agent in the photopolymerizable build material used to form the article measured in weight percent based on the total weight of the photopolymerizable build material.

As described in detail in the Examples below, TRR values may be determined by measuring additive manufactured article tensile modulus at a variety of ionic modifying agent concentrations in the build material, plotting the data with ionic modifying agent along the x-axis and tensile modulus along the y-axis, establishing a best-fit curve for the data plot and taking the derivative of the best-fit curve at an ionic modifying agent concentration of zero to establish the rate of change.

In one or more embodiments, the ionic modifying agent in the photopolymerizable build material may be a flame retarding agent for the additive manufactured article. In such embodiments, the cation of the flame retarding agent may be selected from the group consisting of phosphonium, imidazolium, ammonium, pyrrolidinium, thiazolium, pyrimidinium, pyridazinium, substituted derivatives thereof and the like. In all cases with the exception of phosphonium cation, there is attached one or more functional groups such as phosphates or halogens. In such embodiments, the anion of the flame retarding agent may be selected from the group consisting of halogens, pseudohalogens, phosphates such as for example diethylphosphate, imidazolate, triazolate, tetrazolate, pyrazolate and substituted derivatives thereof. As used herein, the phrase "flame retarding agent" means that a photopolymerized additive manufactured article formed from the photopolymerizable build material achieves a classification of "HB" or better when tested according to UL-94.

In one or more embodiments, the ionic modifying agent in the photopolymerizable build material may be an energetic agent for the additive manufactured article. In such embodiments, the cation of the energetic agent may be selected from the group consisting of imidazolium, pyrazolium, triazolium, tetrazolium, pyradinium, pyrrolidinium, guanidinium, iminium, triazanium, hydrazinium, substituted derivatives thereof and the like. In such embodiments, the anion of the energetic agent may be selected from the group consisting of halide, pseudohalide, imidazolate, pyrazolate, triazolate, tetrazolate, dinitramide, dicyanamide, azide, bistriflimide, triflate, methane-sulfonate, picrate, nitrocyanamide, nitrate, perchlorate, borohydride, cyanoborate, and the substituted derivatives thereof. As used herein, the phrase "energetic agent" means that a photopolymerized additive manufactured article formed from the photopolymerizable build material exhibits a significant amount of releasable stored energy and is therefore useful for example as a pyrotechnic, explosive, propellant or fuel. Energetic agents typically release stored energy in response to an external stimulus such as for example exposure to thermal energy, impact forces, electrical discharge or the like.

In one or more embodiments, a feature of the present invention is that photopolymerized additive manufactured articles from the present photopolymerizable build material exhibit remarkably low and surprisingly unexpected ionic modifying agent leaching. One of ordinary skill will appreciate that leaching of the ionic modifying agent would over time reverse the modification that said agent achieves. For example, in embodiments wherein the ionic modifying agent is a tensile reduction agent, leaching of the ionic modifying agent would result in loss of the tensile modulus reduction and increased material brittleness. Accordingly, in one or more embodiments, the additive manufactured article of the present invention exhibits ionic modifying agent leaching in an amount of no more than 10 weight percent or no more than 8 weight percent or no more than 7 weight percent or no more than 6 weight percent when measured according to ASTM D-1203.

A third aspect of the present invention is an additive manufacturing method for producing a three-dimensional article. The method of the present invention includes the steps of:
  (a) forming a layer of a build material onto a target surface, said build material including (i) a photopolymerizable monomer; (ii) a photoinitiator; and (iii) an ionic modifying agent;
  (b) polymerizing the photopolymerizable monomer of the build material at selected locations by directing electromagnetic wave energy of a wavelength of from 200 nm to 450 nm to the selected locations of the layer, said locations corresponding to a cross-section of the three-dimensional article; and (c) repeating the forming and polymerizing steps to form a three-dimensional article in layerwise fashion.

One of ordinary skill will appreciate that, in the first iteration of forming step (a), the layer is formed on a target surface that is a support or scaffolding conventionally used in additive manufacturing systems. For subsequent iterations of the forming step (a) when repeated according to step (c), the layer is formed on a target surface that is a previously formed layer that includes photopolymerized monomer.

In one or more embodiments, the electromagnetic wave energy may be a moving rastered point source. In one or more embodiments, the electromagnetic wave energy may be a projection of the article cross-section.

In one or more embodiments, method of the present invention further includes an optional step (d) of curing the three-dimensional article by exposing the article to electromagnetic wave energy of a wavelength of from 200 nm to 450 nm. This curing may be useful in for example linking any residual or dangling terminal ends that remain after repeated steps (b).

Systems and equipment for performing the forming and directing steps of the method of the present invention are known in the art, for example as described in U.S. Pat. Nos. 9,878,470B2, 8,512,622B2, D722108S1 and 9492969B2, the contents and disclosure of which are incorporated herein by reference. They are also commercially available, for example from Form Labs, Inc. under the trade name Form 2.

The following examples set forth suitable and/or preferred compositions, articles, methods and results in accordance with the invention. It is to be understood, however, that these examples are provided by way of illustration and nothing therein should be taken as a limitation upon the overall scope of the invention.

EXAMPLES

In the following Examples, photopolymerizable build materials of the present invention were prepared using a pre-formed photopolymerizable monomer/photoinitiator resin blend commercially available from FormLabs of Somerville, MA under the trade name Clear Resin V4™. The blend included methyl methacrylate as photopolymerizable monomer and photoinitiator. For each build material sample of the present invention that was tested, this pre-formed blend was mixed with an amount of 1-butyl-3-methylimidazolium bis(trifluoromethylsulfonyl)imide as an ionic modifying agent, more specifically an ionic tensile modulus reduction agent, with amounts varying between samples from 10 weight percent to 40 weight percent based on the total weight of the photopolymerizable build material. The 1-butyl-3-methylimidazolium bis(trifluoromethylsulfonyl)imide was synthesized as follows: a 500 mL round bottom flask, 100 mL (1.25 mol) of 1-methylimidazole was reacted with 145 mL (1.38 mol) of 1-chlorobutane. The solution was heated at 70° C. and stirred magnetically for 4 days. The product was washed with ethyl acetate to remove any unreacted starting material and dried via vacuum. The resulting 1-butyl-3-methylimidazolium chloride [Bmim][Cl] product was characterized by H1-NMR. An 80% Bis-(trifluoromethylsulfonyl)imidic acid ($HNTf_2$) aqueous solution was added to an aqueous solution of [Bmim][Cl] and magnetically stirred. The resulting ionic liquid, [Bmim][$NTf_2$], phase separated forming the bottom phase of a two-phase system.

To form additive manufactured articles of the present invention, the above build materials were used to form (i) Type I "dog bones" for tensile testing in accordance with ASTM Standard D 638-02 and (ii) discs of 50 mm diameter and 1 mm thickness for leaching testing in accordance with ASTM D1203. All discs were formed from build materials that included 30 weight percent ionic modifying agent. The articles were additive manufactured using a FormLab Form 2 3D printer with PreForm software in Open Mode to allow for printing of custom resin formulations and resolution set to 50 µm. Specific geometries, thicknesses etc. for each article type were rendered using a CAD program generating .stl files that were loaded into the PreForm software. The software auto-generated optimal scaffolding to support the article's shape during printing. The referenced printer operates at 405 nm and 250 mW power with a rastered point source.

Each print session produced three articles/specimens, which were washed in isopropanol for 20 minutes to remove excess and unreacted resins and then dried at ambient conditions for 30 minutes. The scaffolding was then removed. Select "dog bone" samples were further cured for 15 minutes with 405 nm electromagnetic energy in a FormLabs Form Cure device preheated to 60° C.

Figure 2:
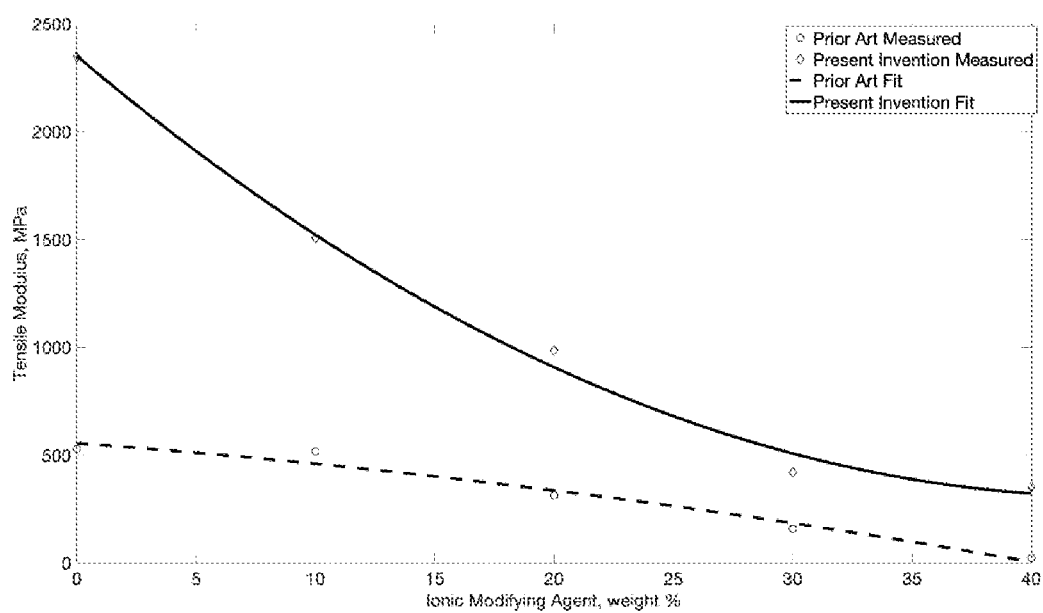

The "dog bone" articles of the present invention were then tested for tensile modulus in accordance with ASTM D 638-02. Testing was performed on a Tinius Olsen 60SL universal testing machine with flat wedge grips used for specimen loading and a Class B extensometer to measure strain. Tests were run at 0.02 in./min. crosshead motion rate and each test was concluded upon reaching 0.4% strain. The stress-strain data was then analyzed using the curve-fitting package with MATLAB. To compensate for the "toe" in the stress-strain curve, an artifact at the beginning of the test resulting from the take-up of slack and specimen alignment, the modulus was defined as the ratio of stress to strain between 0.1% and 0.4% strain. The results of the modulus testing for various build materials of the present invention are shown in FIGS. 1 and 2 herein, which also show for comparison purposes data as published by Brazel et al describing incorporation of ionic liquids in bulk poly(methyl methacrylate) polymerization [M. P. Scott, C. S. Brazel, M. G. Benton, J. W. Mays, J. D. Holbrey, R. D. Rogers, Chem. Comm., 2002, 13, 1370; M. P. Scott, M. Rahman, C. S. Brazel, Eur. Polym. J., 2003, 39, 1947]. FIG. 1 shows results for articles formed by a method that did not include the additional curing step described above while FIG. 2 shows results for articles formed by a method that did include the described additional curing step.

The data used to create the Figures was fit to a function $f(x)=A+B*x+C*x^2$. with data published by Brazel et al corresponding to a best-fit curve of $f(x)=556-8.2*x-0.1393*x^2$ and the data from the present invention corresponding to a best-fit curve of $f(x)=2352-93.65*x+1.073*x^2$ for articles made by the method of the present invention with the optional curing step (as shown in FIG. 2) and $f(x)=1642-43.41*x+0.1219*x^2$ for articles made by the method of the present invention without the optional curing step (as shown in FIG. 1). TRR was evaluated by taking the derivative of the best-fit curves at zero ionic modifying agent concentration (x=0) which is simply B. TRR for the examples of the present invention is therefore 43.41 MPa per weight percent ionic modifying agent for the specimens printed without the optional curing step and 93.65 MPa per weight percent ionic modifying agent when the optional curing step is added, whereas TRR for the control or comparison data is 8.2 MPa per weight percent ionic modifying agent with the numeric values indicative of tensile modulus reduction though not negative in form since TRR is shown as the absolute value.

As demonstrated by the above data, the amount of ionic modifying agent required to achieve a given tensile modulus reduction in the additive manufactured article is markedly lower that what would be expected from the prior art. Further, the rate of change for reducing tensile modulus in the additive manufactured article via addition of ionic modifying agent in the build material is unexpectedly greater. Indeed, as demonstrated by taking the derivative of the best-fit curve at zero weight %, the present invention achieves unexpected and surprisingly significant initial reductions in article modulus with minimal changes in initial ionic modifying agent concentrations in the build material.

The fifteen additive manufactured disc articles, all formed from build materials with 30 weight percent ionic modifying agent [Bmim][NTf$_2$] (1-butyl-3-methylimidazolium bis(trifluoromethylsulfonyl)imide) and all subjected to the further curing step described above, were tested for ionic modifying agent leaching in accordance with ASTM D1203. The articles were covered by 50 ml of 6/14 mesh activated carbon and placed in a gravity oven heated to 70° C. for 24 hours. Ionic modifying agent loss was determined by weighing the specimens before and after the test period. Data indicated a mean leaching loss of 5.946+−0.3 weight percent. Control sample discs of neat poly(methyl methacrylate) were also formed and tested to discern any mass loss not attributable to ionic modifying agent leaching. Data from the control samples indicated a loss of 0.765 weight percent, confirming that mass loss is attributable almost entirely to loss of ionic modifying agent. By comparison, it is noted that the data published by Brazel et al referenced above, in which leaching of [Bmim][PF6] in PMMA bulk polymerization was tested, indicates leaching loss of 13.6%.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A photopolymerizable build material for additive manufacturing applications, said build material comprising:
   (i) a photopolymerizable monomer;
   (ii) a photoinitiator; and
   (iii) an ionic modifying agent, wherein said ionic modifying agent is an energetic agent.

2. The photopolymerizable build material of claim 1 wherein the ionic modifying agent comprises at least one cation selected from the group consisting of ammonium, imidazolium, pyrazolium, triazolium, tetrazolium, pyradinium, pyrrolidinium, guanidinium, iminium, triazanium, hydrazinium and substituted derivatives thereof.

3. The photopolymerizable build material of claim 1 wherein said ionic modifying agent comprises at least one anion selected from the group consisting of imidazolate, pyrazolate, triazolate, tetrazolate, dinitramide, dicyanamide, azide, picrate, nitrocyanamide, nitrate, perchlorate, borohydride, and substituted derivatives thereof.

4. The photopolymerizable build material of claim 2 wherein said ionic modifying agent comprises at least one anion selected from the group consisting of imidazolate, pyrazolate, triazolate, tetrazolate, dinitramide, dicyanamide, azide, picrate, nitrocyanamide, nitrate, perchlorate, borohydride, and substituted derivatives thereof.

5. The photopolymerizable build material of claim 1 wherein said ionic modifying agent is an ionic modifying monomer that is copolymerizable with said photopolymerizable monomer.

6. The photopolymerizable build material of claim 1 wherein said ionic modifying agent is present in said photopolymerizable build material in an amount of between 0.5 and 60 weight percent based on the total weight of said photopolymerizable build material.

7. The photopolymerizable build material of claim 1 wherein said photopolymerizable monomer is methyl methacrylate or a derivate thereof.

8. The build material of claim 1 further comprising one or more one or more of reactive diluents, polymerization inhibitors, release agents, wetting agents, levelling agents, sensitizers, antisettling agents, surface-active agents, colorants, heat stabilizers, light or radiation stabilizers, cross-linking agents, photosensitizers, blockers, plasticizers, antioxidants, compatibilizers, flow aids and filler materials.

9. An additive manufactured article comprising at least 50 photopolymerized layers formed from the photopolymerizable build material of claim 1.

10. A photopolymerizable build material for additive manufacturing applications, said build material comprising:
    (i) a photopolymerizable monomer;
    (ii) a photoinitiator; and
    (iii) an ionic modifying agent, wherein said ionic modifying agent is a flame retarding agent that is a salt that includes at least one cation and at least one anion and which has a melt point when measured according to ASTM E 324 of no more than 100° C.

11. A photopolymerizable build material for additive manufacturing applications, said build material comprising:
    (i) a photopolymerizable monomer;
    (ii) a photoinitiator; and
    (iii) an ionic modifying agent, wherein said ionic modifying agent is a flame retarding agent that is not an ionic modifying monomer that is copolymerizable with said photopolymerizable monomer.

12. The photopolymerizable build material of claim 10 wherein the ionic modifying agent comprises at least one cation selected from the group consisting of phosphonium, imidazolium, ammonium, pyrrolidinium, thiazolium, pyrimidinium, pyridazinium and substituted derivatives thereof; and wherein, in all cases with the exception of said phosphonium cation, there is attached a halogen or a phosphate functional group.

13. The photopolymerizable build material of claim 12 wherein said ionic modifying agent comprises at least one anion selected from the group consisting of halogens, pseudohalogens, phosphates, imidazolate, triazolate, tetrazolate, pyrazolate, and substituted derivatives thereof.

14. An additive manufactured article comprising at least 50 photopolymerized layers formed from the photopolymerizable build material of claim 10.

15. An additive manufactured article comprising at least 50 photopolymerized layers formed from the photopolymerizable build material of claim 11.

\* \* \* \* \*